(12) United States Patent
Hattori

(10) Patent No.: US 6,467,709 B1
(45) Date of Patent: Oct. 22, 2002

(54) GRANULATOR OF MATERIAL

(75) Inventor: Yoshinobu Hattori, Tokyo (JP)

(73) Assignee: S. G. Engineering Corporation, Tokyo (JP)

( * ) Notice: Subject to any disclaimer, the term of this patent is extended or adjusted under 35 U.S.C. 154(b) by 0 days.

(21) Appl. No.: 09/617,812

(22) Filed: Jul. 17, 2000

(30) Foreign Application Priority Data

Jul. 19, 1999 (JP) .......................................... 11-204999

(51) Int. Cl.⁷ .............................................. B02C 19/00
(52) U.S. Cl. ........................................... 241/30; 241/95
(58) Field of Search ................. 241/95, 82.5, 82.6, 241/82.7, 30

(56) References Cited

U.S. PATENT DOCUMENTS

| | | |
|---|---|---|
| 3,350,485 A | 10/1967 | Sheshler et al. |
| 4,438,146 A | 3/1984 | Colby et al. |
| 4,457,685 A | 7/1984 | Huang et al. |
| 5,227,109 A | 7/1993 | Allen et al. |
| 5,326,038 A * | 7/1994 | Nilsson ........................ 241/95 |

* cited by examiner

Primary Examiner—Mark Rosenbaum
(74) Attorney, Agent, or Firm—Heller Ehrman White and McAuliffe

(57) ABSTRACT

A granulator for finely granulating pressurized raw material comprises a cylindrical body provided with an inlet and an outlet, at least two plates superposed on each other such that the plates are flush with the cylindrical body and assembled into the cylindrical body such that mutual relative positional relation is maintained, each of the plates comprises a large number of through holes and a large number of grooves for connecting the through holes to one another on each of the superposed faces of the plates, and the grooves in one of the plates intersect with the grooves in the other plate on the superposed faces at a large number of positions in a state in which the plates are superposed on each other.

8 Claims, 9 Drawing Sheets

GRANULATOR OF MATERIAL

BACKGROUND OF THE INVENTION

1. Field of The Invention

The present invention relates to a granulator for finely granulating material handled in various industries such as food, chemical and medical industries, and more particularly, to a granulator for finely granulating material into lactescent, dispersed or crushed state particles having uniform (or homogeneous) particle diameters of micron or smaller, thereby obtain stable particle size distribution.

2. Description of The Related Art

As a conventional granulator of material, an APV galling homogenizer investigated by inventer uses a principle shown in FIG. 1 (not prior art). That is, in FIG. 1, a valve 2 is opposed to a valve seat 1 while leaving a slight gap therebetween. Raw material sent under a high pressure is ejected from the gap to collide against an inner wall of an impact ring 3, thereby finely granulating and homogenizing material in the raw material, and the obtained material is taken from a body 4. In this conventional granulator, a desired amount of processed material (1 to 40 ton/h) is obtained under a processing pressure of hundreds kgh/cm$^2$ to 1,000 kgf/cm$^2$ using this principle.

However, in the case of this conventional granulator, it is difficult to adjust the fine gap for allowing the raw material to eject for obtaining a desired amount of processed material (per time). For this reason, the gap, which is greater in some degree, must be used. Therefore, there are problem that the processing pressure applied to the raw material is inevitably increased as high as hundreds kgh/cm$^2$ to 1,000 kgf/cm$^2$, the entire granulator becomes expensive for pressure proofing.

SUMMARY OF THE INVENTION

The present invention has been achieved to solve the above problems, and it is therefore an object of the invention to provide a granulator capable of finely granulating a raw material without increasing a processing pressure applied to the raw material unlike the conventional technique, and capable of obtaining a desired amount of processed material.

To achieve the above object, the present invention has structures as described in aspects below. That is, according to a first aspect of the invention, there is provided a granulator for material comprising a cylindrical body provided with an inlet and an outlet, at least two plates superposed on each other such that the plates are flush with the cylindrical body and assembled into the cylindrical body such that mutual relative positional relation is maintained, wherein each of the plates comprises a large number of through holes and a large number of grooves for connecting the through holes to one another on each of the superposed faces of the plates, and the grooves in one of the plates intersect with the grooves in the other plate on the superposed faces at a large number of positions in a state in which the plates are superposed on each other.

According to the invention of the first aspect, raw material flowed into one through hole of the plate A head-on collides against a flat face of the plate B perpendicularly, and the raw material is diverted into upper, lower, left and right grooves which connect through holes and adjacent through holes to each other. The raw material flowing into one groove from opposite sides head-on collides against other raw material at an intersection of the groove of the plate B and merge with each other, and flow into opposite sides of the groove of the plate B.

In the plate B, raw material flowing into one through hole from the upper, lower, left and right grooves head-on collides with other raw material on the parting face, and the raw material flows into a direction perpendicular to the parting face, and flows through this through hole into a lower pressure side.

The plates A and B include the large number of through holes and grooves, and the grooves of both the plates intersect with each other on the superposed faces. Therefore, head-on collisions occur in many places and thus, even if the processing pressure is equal to or lower than 100 kgf/cm$^2$ (e.g., 70 kgf/cm$^2$), the material in the raw material is granulated, and a desired processing amount of material can be granulated.

According to a second aspect of the invention, in the granulator for material of the first aspect, the large number of through holes are arranged in a lattice-pattern, the through holes of the one plate are located in wall portions of the lattice pattern with respect to the through holes of the other plate, and the large number of grooves intersect with each other at a large number of positions.

With the invention of the second aspect, since the large number of through holes are located at the walls of the lattice pattern, all the raw material flowing into the large number of through holes of the plate A head-on collides in a direction perpendicular to the walls of the plate B, it is possible to reliably achieve the effect of the invention of the first aspect.

According to a third aspect of the invention, in the granulator for material of the first aspect, the large number of through holes provided in the plates are arranged in the same manner or in such a manner that all walls of the lattice pattern on each of the superposed faces are closed with each other in a state in which the plates are superposed on each other.

With the invention of the third aspect, the large number of through holes provided in the plates are arranged in the same manner or in such a manner that all walls of the lattice pattern on each of the superposed faces are closed with each other in a state in which the plates are superposed on each other. Therefore, the large number of grooves intersect with each other at right angles in a large number of locations, and it is possible to reliably achieve the effect of the invention of the first aspect.

According to a fourth aspect of the invention, in the granulator for material of the first aspect, a shape of the cylindrical body is circular.

According to the invention of the fourth aspect, since the shape of the cylindrical body is circular, stagnation of the flow of raw material and dispersion of flow rate caused by the stagnation are reduced to the minimum, and it is possible to reliably achieve the effect of the invention of the first aspect.

According to a fifth aspect of the invention, there is provided a granulating system for material comprising a raw material supplying port for supplying raw material, a high pressure pump for pressurizing the raw material sent from the raw material supplying port, a granulator for granulating the raw material sent from the high pressure pump; and a granulated product receiver for taking out granulated product which was finely granulated by the granulator, wherein the granulator comprises a cylindrical body provided with an inlet and an outlet, at least two plates superposed on each other such that the plates are flush with the cylindrical body and assembled into the cylindrical body such that mutual relative positional relation is maintained, wherein each of the plates comprises a large number of through holes and a large number of grooves for connecting the through holes to one another on each of the superposed faces of the plates, and the grooves in one of the plates intersect with the grooves in the other plate on the superposed faces at a large number of positions in a state in which the plates are superposed on each other.

Therefore, according to the present invention, when the material is finely granulated, the processing pressure can be reduced while keeping the processing ability, and the cost of the entire apparatus can be reduced.

DESCRIPTION OF THE PREFERRED EMBODIMENT

Figure 1:
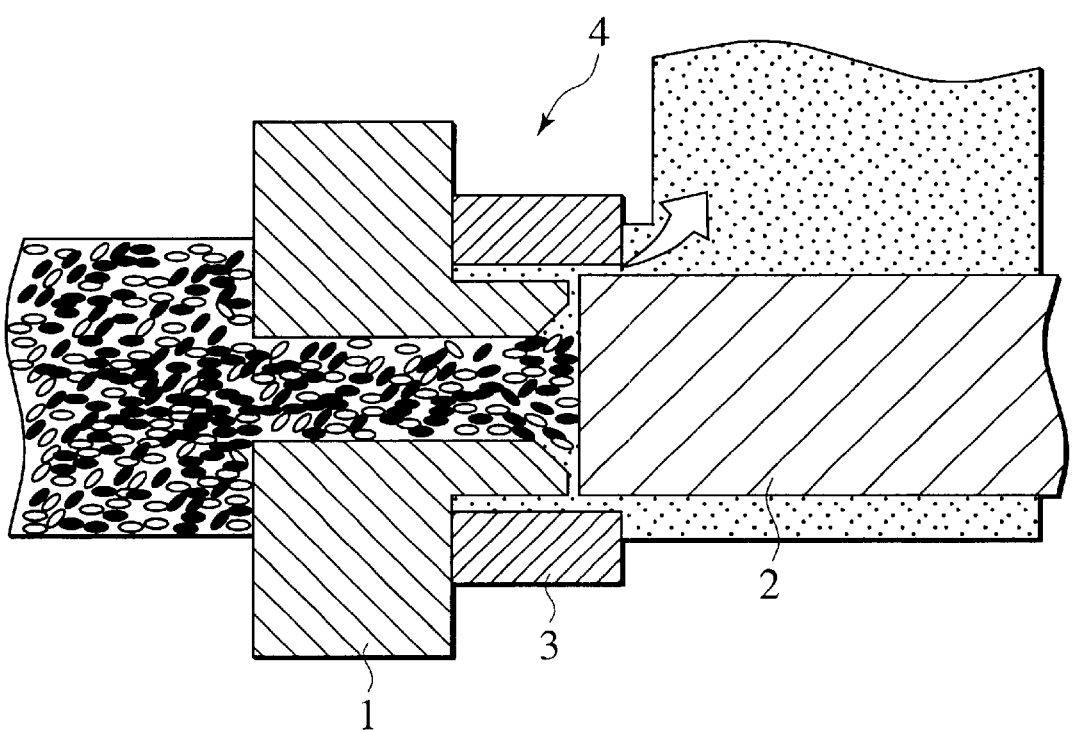
FIG. 1 is an explanatory diagram of a principle of a conventional apparatus.
Figure 2:
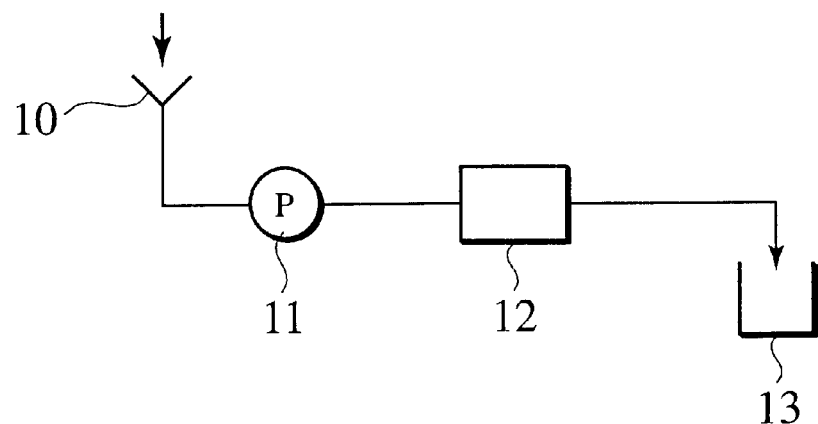
FIG. 2 is a general system diagram including a granulator of the present invention.

An embodiment of the present invention will be explained with reference to FIGS. 2 to 4. In a general system diagram in FIG. 2, a symbol 10 represents a raw material supplying port 10, a symbol 11 represents a high pressure pump for pressurizing a raw material under a pressure of about 70 kgf/cm$^2$, a symbol 12 represents a system generator, i.e., a granulator which can be also called as heart of the system, and a symbol 13 represents a receiver of a finely granulated product.

Figure 3:
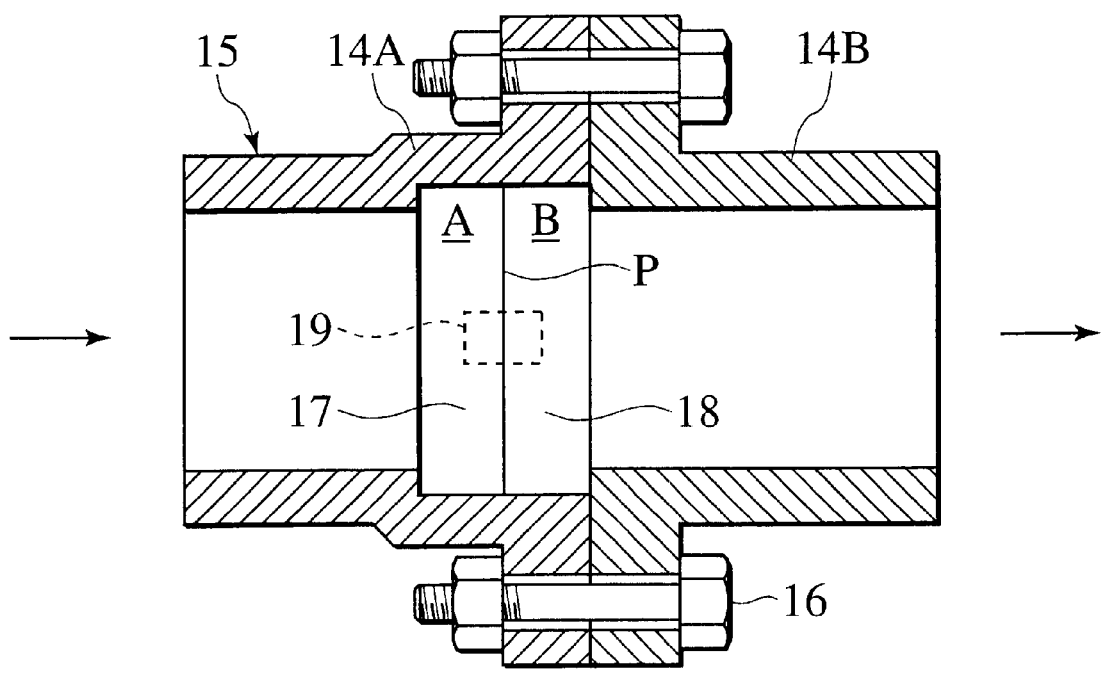
FIG. 3 is a vertical sectional view of the entire granulator shown in FIG. 2.

FIG. 3 is a sectional view of a body 12. The body 12 includes a single cylindrical body 15 comprising an inlet-side cylinder 14A and an outlet-side cylinder 14B coupled to each other by a bolt 16, and a disc A17 and a disc B18 as so-called elements made of hard material. The disc A17 and the disc B18 are superposed at a position determined by a pin 19 and assembled into the cylindrical body 15 such that the disc A17 and the disc B18 are flush with P faces.

Figure 4:
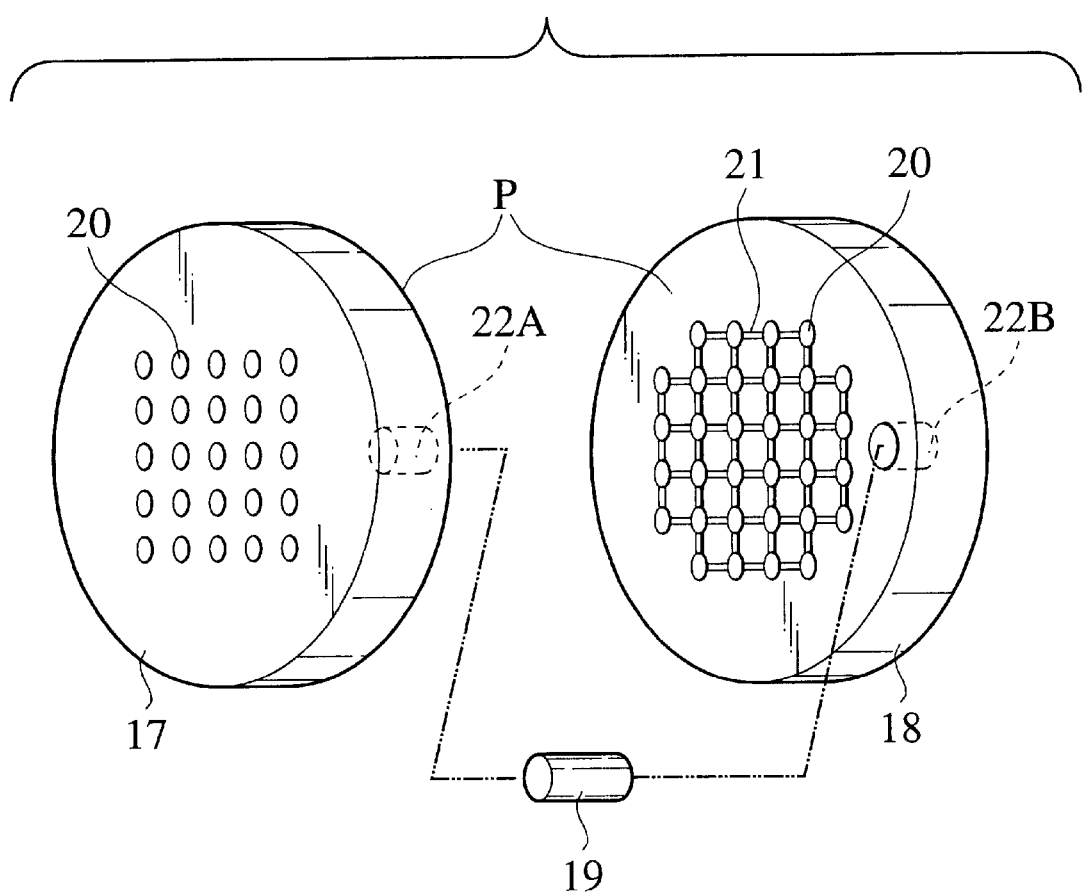
FIG. 4 is a perspective view of discs A and B which are elements shown in FIG. 3.

As shown in schematically in a perspective view of FIG. 4, the disc A17 and the disc B18 have the same outer diameters and thicknesses. Both the disc A17 and disc B18 have a large number of through holes 20 arranged in a vertically and horizontally lattice manner, and have a large number of grooves 21 for connecting the through holes 20 to one another. The grooves 21 are formed on the P faces. In FIG. 4, since grooves 21 of the disc A17 exist on its back face, they are not shown in FIG. 4.

The disc A17 and disc B18 respectively have a hole 22A and a hole 22B into which the pin 19 is inserted. In a state in which both the discs are superposed, the lattice-like through holes formed on one of the discs are positioned on wall portions of the lattice pattern of the other disc. At that time, the grooves of the one disc and the grooves of the other disc intersect with each other at right angles on a large number of locations.

Figure 5:
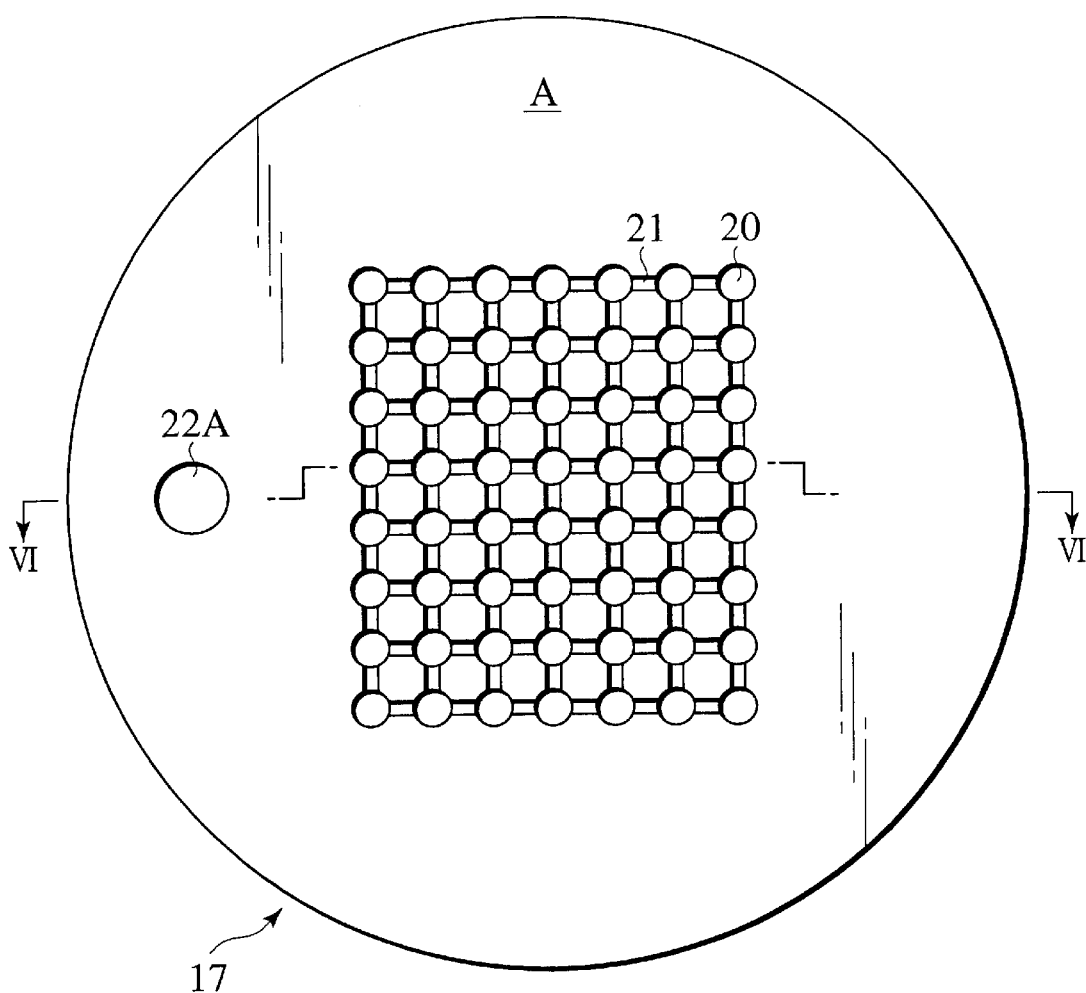
FIG. 5 is a front view of the disc A of an embodiment (large diameter)
Figure 6:
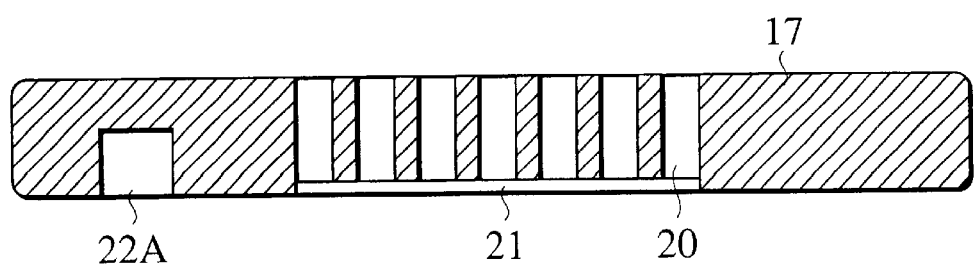
FIG. 6 is a sectional view taken along the line VI—VI in FIG. 5.

FIGS. 5 to 8 show one embodiment of discs A and B. In FIG. 5, the disc A17 having a thickness of 40 mφ, 5 mm is provided with 56 through holes 20 in all of 1.36 mmφ with seven columns and eight rows at with 2.6 mm pitches so that 10 ton/h processing can be carried out. The grooves 21 of 0.7 mm width and 0.5 mm depth are provided for connecting the through holes 20 to one another.

Figure 7:
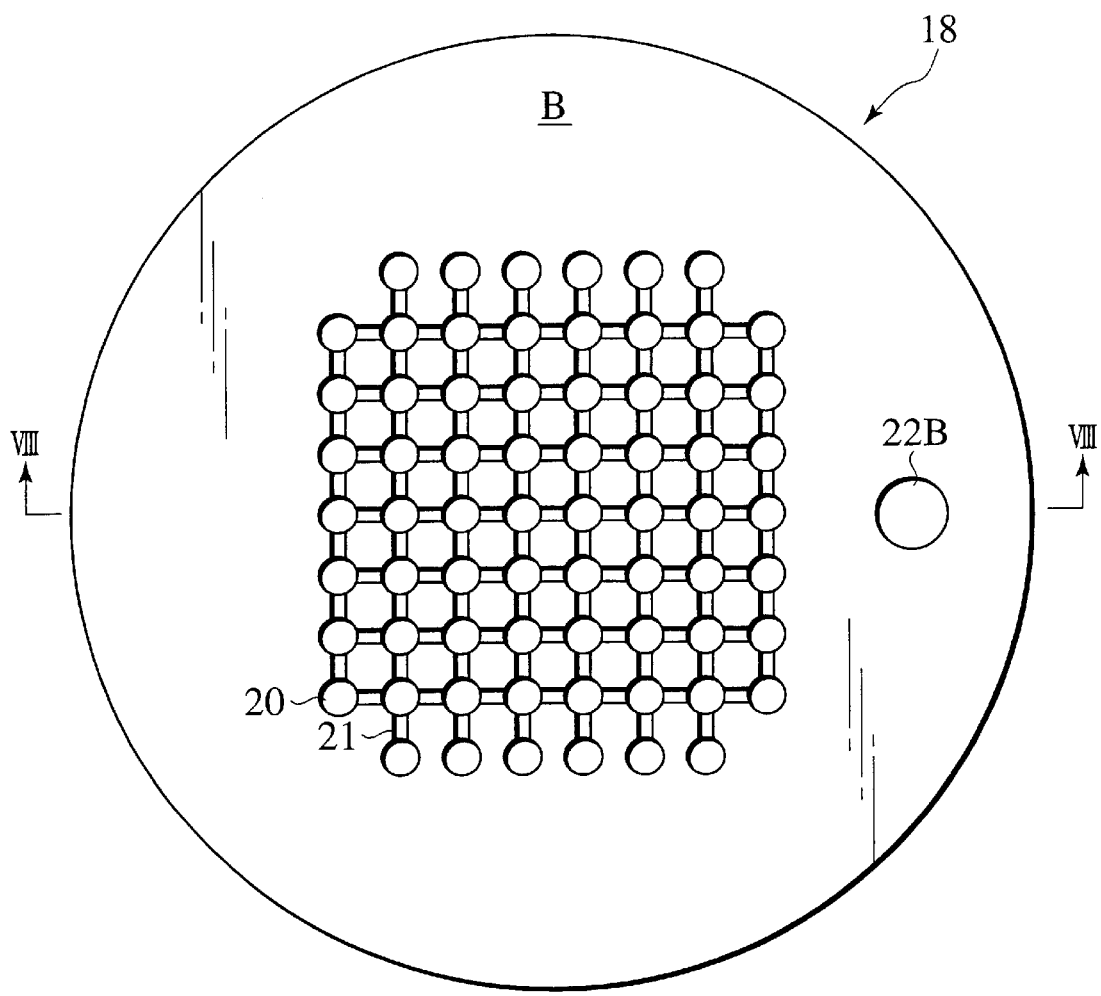
FIG. 7 is a front view of the disc B which pairs with the disc A shown in FIG. 5.

In FIG. 7, the disc B18 paring with the disc A17 is provided with a total of 68 through holes 20 of 1.48 mmφ (which is slightly larger than that of the disc A but may be the same as that of the disc A) with eight columns and nine rows at with the same pitches except four corners. The grooves 21 of the same width and same depth are provided for connecting the through holes 20 to one another.

Figure 8:
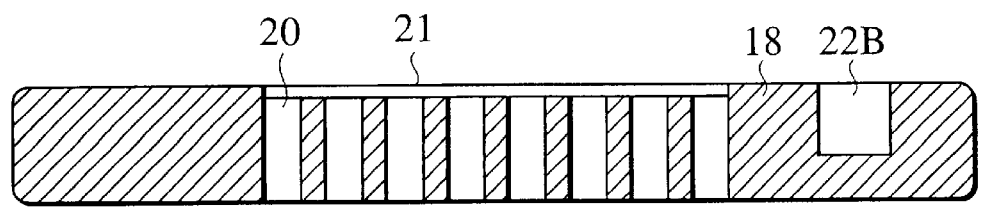
FIG. 8 is a sectional view taken along the line VIII—VIII in FIG. 7.

If the discs shown in FIGS. 5 and 7 are superposed on each other such that the holes 22A and 22B are aligned to each other, as shown in the schematic diagram shown in FIG. 8, one side through holes 20 (shown with solid lines) are positioned on the walls 23 of the lattice pattern of the other side through holes 20 (shown with dotted lines), and the grooves; 21 of the disc A16 shown with solid lines and the grooves 21 of the disc B17 shown with dotted lines intersect with each other at right angles.

Figure 10:
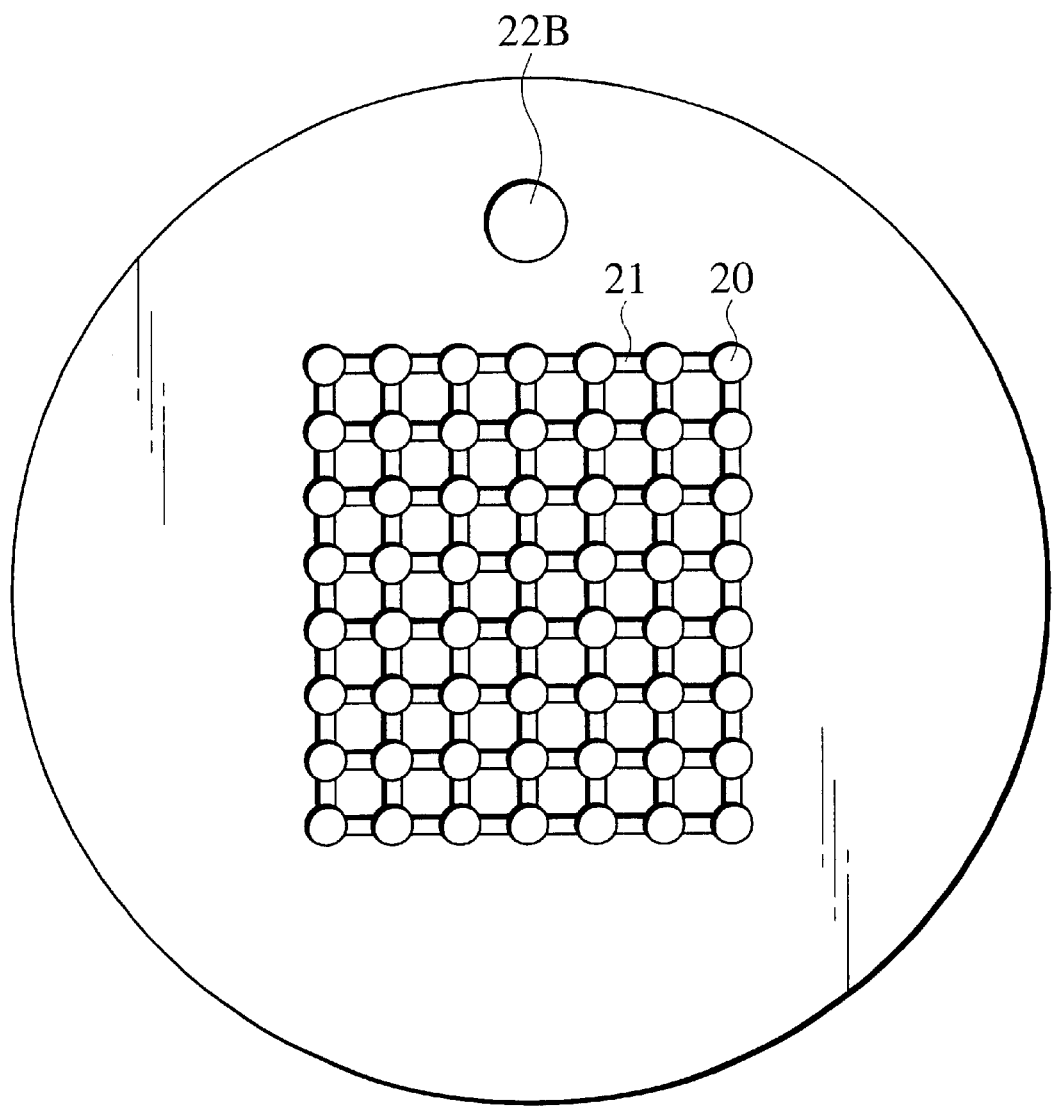
FIG. 10 is a front view of a modification of the disc A in which only the parting position holes are changed as a substitute for the disc B.

In FIG. 10, the through holes 20 and the grooves 21 are arranged in the same manner of the arrangement shown in FIG. 5, but a hole 22B is provided directly above the through holes 20 and the grooves 21. This disc B substitutes as the disc shown in FIG. 7.

Figure 9:
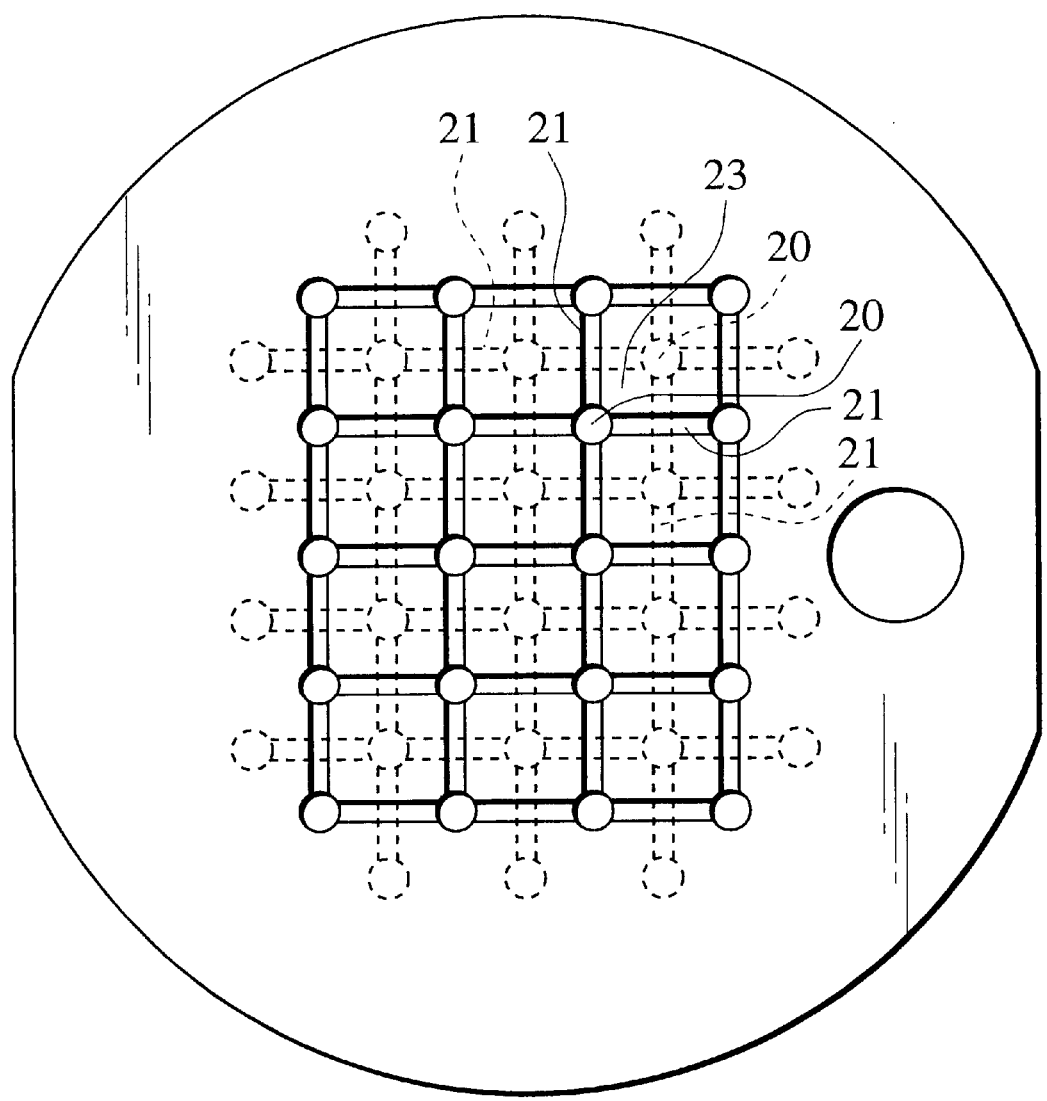
FIG. 9 is a schematic view of parting faces of the discs showing a superposed state between a large number of through holes and grooves of the disc A shown in FIG. 5 and the disc B shown in FIG. 7.

That is, if the disc shown in FIG. 10 is superposed on the disc shown in FIG. 4 such that the holes 22A and 22B are aligned to each other, the structure thereof is the same as that shown in FIG. 9. In this case, the working of the through holes and the grooves between the disk A and B is quite the same, and only working positions of the positioning holes 22A and 22B may be changed.

Figure 11:
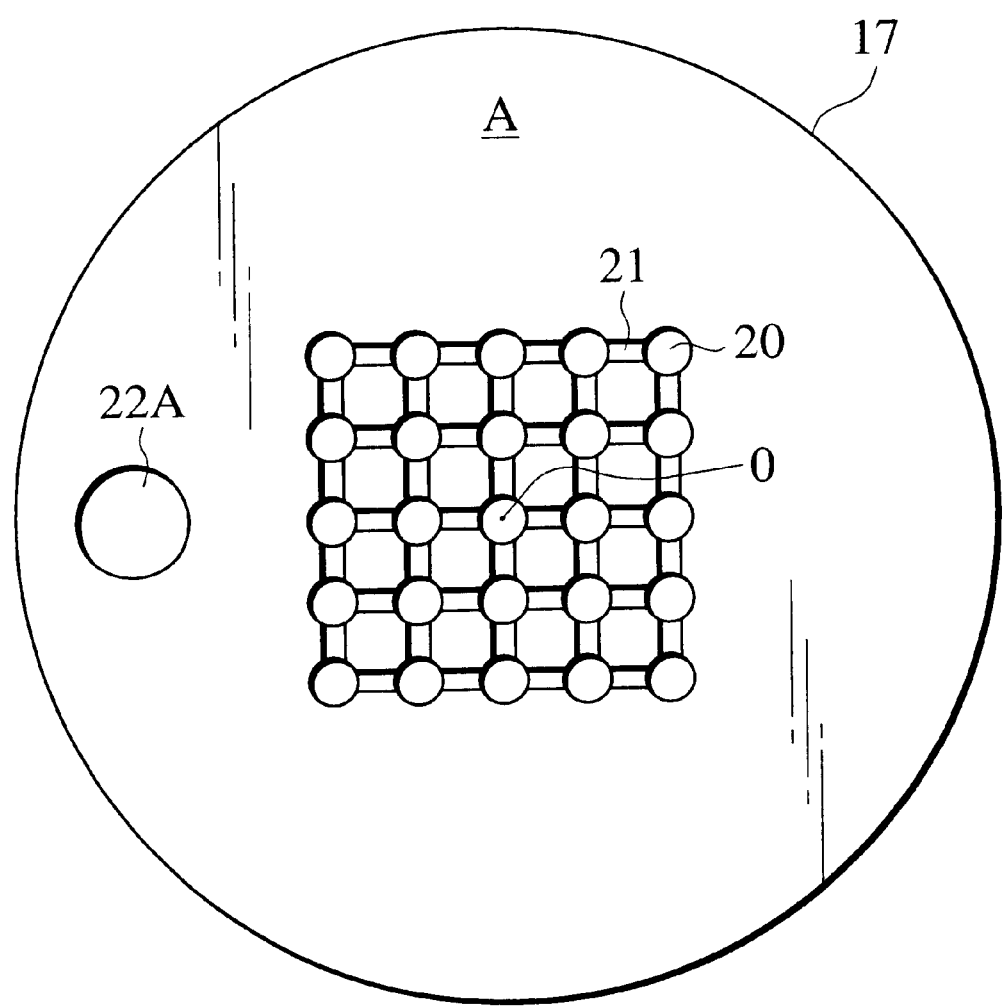
FIG. 11 is a front view of the disc A of another embodiment (small diameter)
Figure 12:
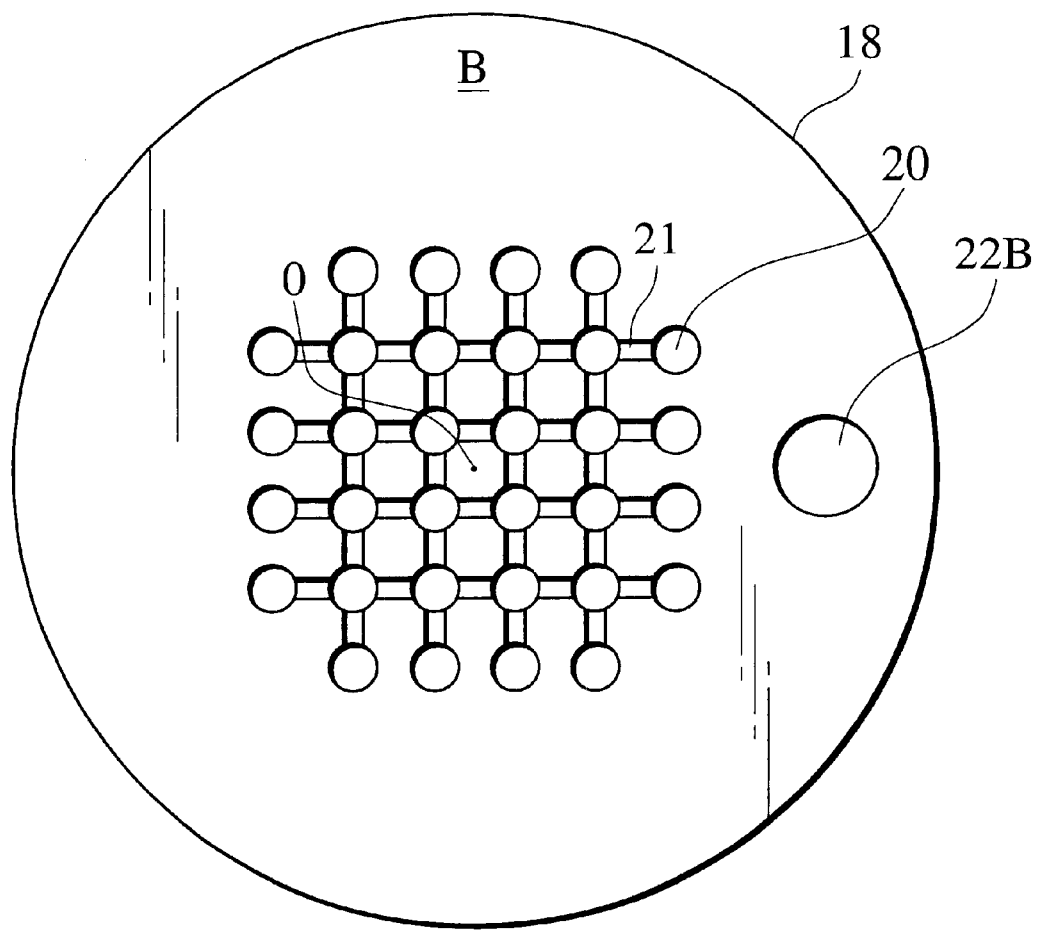
FIG. 12 is a front view of the disc B that pairs with the disc A shown in FIG. 11.

FIGS. 11 and 12 shows concrete examples of a disc A17 and a disc B18 of thickness of 26 mmφ, 5 mm capable of processing 4 ton/h. The sizes of the through holes 20 and the grooves 21 are the same as those shown in FIGS. 5 and 7, but the disposition and the number thereof are different.

That is, in FIG. 11, there are 25 through holes 20 in all arranged from the center O of the disc A17 with equal pitches, and in FIG. 12, there are 32 through holes 20 in all except on the center O of the disc B18. If the discs A and B are superposed, the structure thereof becomes substantially the same as that shown in FIG. 9.

In the present invention, the large number of through holes and the grooves provided in the discs A and B may be arranged in circumferential and radial directions rather than arranging them in the vertical and horizontal lattice-like pattern. In both the disc A and B, the large number of through holes and the grooves may be arranged in quiet the same manner, and they may be aligned by deviating center positions or rotating through a predetermined angle, and the grooves may intersect with each other at a large number of positions such that the through holes are not superposed on each other.

The number of discs A and B is not limited to two, and three or more discs may be combined.

What is claimed is:

1. A granulator for material comprising:

a cylindrical body provided with an inlet and an outlet, at least two plates superposed on each other such that said plates are flush with said cylindrical body and assembled into said cylindrical body such that mutual relative positional relation is maintained, wherein each of said plates comprises through holes and grooves for connecting said through holes to one another on each of the superposed faces of said plates, and said grooves in one of said plates intersect with said grooves in another plate on said superposed faces at a large number of positions in a state in which said plates are superposed on each other.

2. A granulator for material according to claim 1, wherein said through holes are arranged in a lattice-pattern, said through holes of said one plate are located in wall portions of said lattice pattern with respect to said through holes of said other plate.

3. A granulator for material according to claim 2, wherein said through holes provided in said plates are arranged in the same manner or in such a manner that all walls of said lattice pattern on each of said superposed faces are closed with each other in a state in which said plates are superposed on each other.

4. A granulator for material according to claim 1, wherein a shape of said cylindrical body is circular.

5. A granulating system for material comprising:

a raw material supplying port for supplying raw material, a high pressure pump for pressurizing said raw material sent from said raw material supplying port, a granulator for granulating said raw material sent from said high pressure pump, and a granulated product receiver for taking out granulated product which was finely granulated by said granulator, wherein said granulator comprises a cylindrical body provided with an inlet and an outlet, at least two plates superposed on each other such that said plates are flush with said cylindrical body and assembled into said cylindrical body such that mutual relative positional relation is maintained, wherein each of said plates comprises through holes and grooves for connecting said through holes to one another on each of the superposed faces of said plates, and said grooves in one of said plates intersect with said grooves in another plate on said superposed faces in a state in which said plates are superposed on each other.

6. A granulator for material comprising:

a cylindrical body provided with an inlet and an outlet, at least two cylindrical plates superposed on each other such that said plates are flush with said cylindrical body and assembled into said cylindrical body such that mutual relative positional relation is maintained, wherein each of said plates comprises through holes and grooves for connecting said through holes to one another on each of the superposed faces of said plates, and said grooves in one of said plates intersect with said grooves in another plate on said superposed faces at a large number of positions in a state in which said plates are superposed on each other.

7. A process of granulating a material comprising feeding a pressurized raw material to a granulator for material comprising a cylindrical body provided with an inlet and an outlet, at least two plates superposed on each other such that said plates are flush with said cylindrical body and assembled into said cylindrical body such that mutual relative positional relation is maintained, wherein each of said plates comprises a large number of through holes and a large number of grooves for connecting said through holes to one another on each of the superposed faces of said plates, and said grooves in one of said plates intersect with said grooves in the other plate on said superposed faces at a large number of positions in a state in which said plates are superposed on each other and obtaining a granulated material from the granulator.

8. A method of granulating material in a granulator, said granulator having at least two plates superposed on each other, said plates having a large number of through holes and a large number of grooves for connecting said through holes to one another on each of the superposed faces of said plates, comprising:

pressurizing a material provided by supply port;

flowing said material into through holes of one plate wherein said material collides head-on against a flat face of another plate;

diverting said material into grooves of said one plate, which grooves connect said through holes of said one plate to each other, colliding said material head-on against other material flowing from an opposite direction than said material in said grooves of said one plate;

diverting said material into grooves of said another plate;

colliding said material head-on against other material flowing from an opposite direction than said material in said grooves of said another plate;

flowing said material in a direction perpendicular to a parting face of said plates through a hole of said another plate; and and removing a granulated material from said granulator.

* * * * *